Oct. 9, 1934.  E. W. HUTCHINGS  1,976,172
BAND SAW
Filed June 16, 1933  2 Sheets-Sheet 1
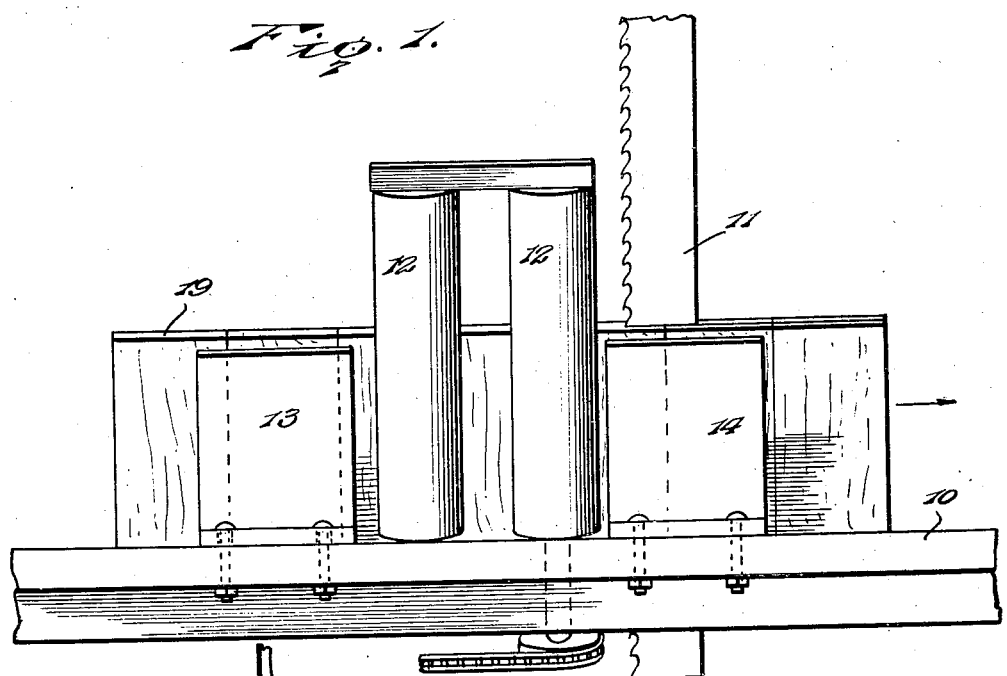
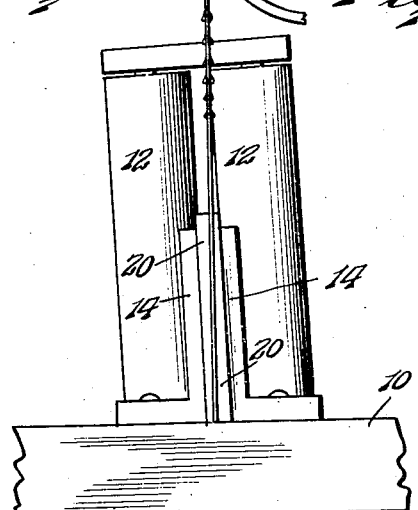
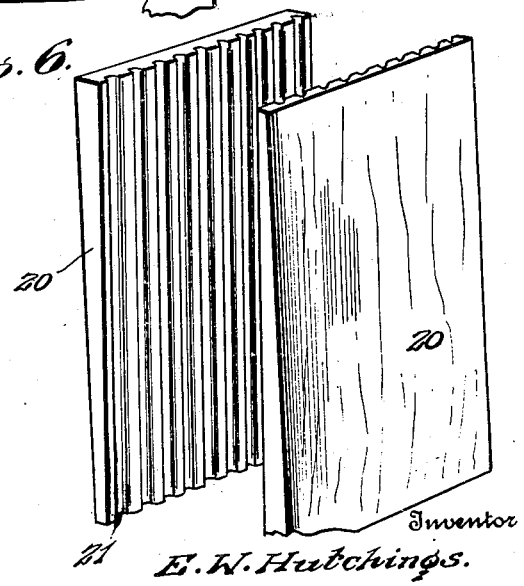
Inventor
E. W. Hutchings.
By Lacey & Lacey, Attorneys Oct. 9, 1934.  E. W. HUTCHINGS  1,976,172
BAND SAW
Filed June 16, 1933   2 Sheets-Sheet 2
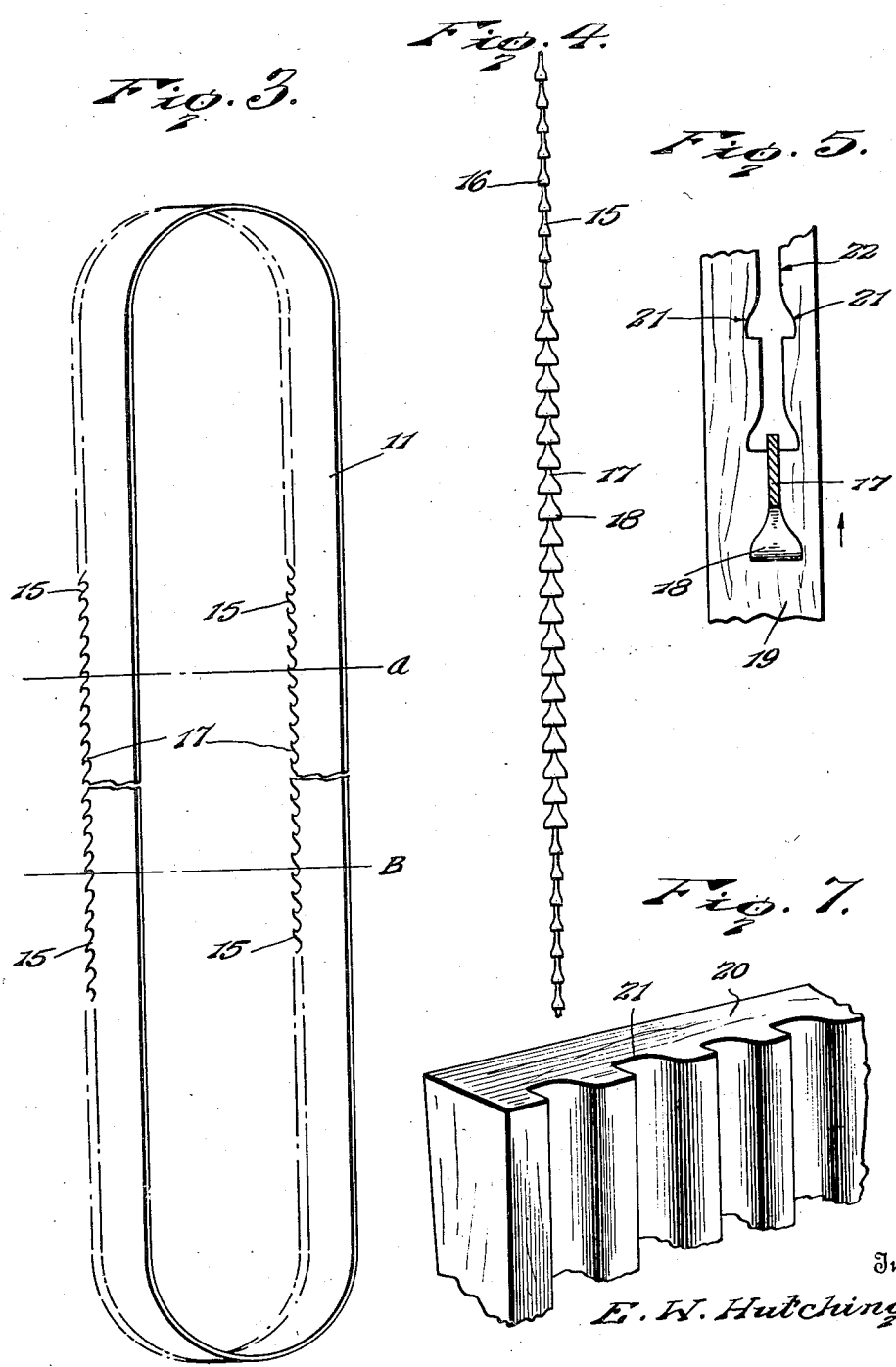
Inventor
E. W. Hutchings.
By Lacey & Lacey, Attorneys Patented Oct. 9, 1934

1,976,172

UNITED STATES PATENT OFFICE 1,976,172

BAND SAW

Edward W. Hutchings, Perry, Fla.

Application June 16, 1933, Serial No. 676,167

4 Claims. (Cl. 143—133)

This invention relates to an improved band saw and seeks, among other objects, to provide a saw adapted to form parallel drip grooves or channels in the confronting faces of shingles or other lumber at the time the lumber is resawed to provide the shingles or other products.

In my co-pending application for Shingles, filed September 21, 1932, Serial Number 634,228, I have shown a machine-made shingle rived by a vertical resaw, the boards being cut from edge to edge obliquely to the side faces of the boards to provide shingles wherein the wood is severed substantially parallel to the grain to provide drip grooves or channels in the sawed faces of the boards. Such drip grooves or channels are however, not very pronounced and the present invention, therefore, seeks to provide a band saw which will form more or less pronounced drip grooves or channels in the sawed faces of the boards substantially parallel to the grain of the wood.

And the invention seeks, as a still further object, to provide a band saw which may be readily employed in connection with conventional machines without the necessity for structural change therein.

With the foregoing and other objects in view, the invention consists in certain novel details of construction and combinations of parts hereinafter fully described and claimed.

In the accompanying drawings forming part of this specification, Figure 1 is a fragmentary side elevation showing my improved band saw in connection with a resaw of the character illustrated in my prior application previously identified, Fig. 2 is a rear elevation of the parts shown in Fig. 1, Fig. 3 is a detail perspective view of the band saw, Fig. 4 is a detail elevation looking at the teeth of the band saw and showing one group of wide swedged teeth of the saw, Fig. 5 is a fragmentary section showing the manner in which the wide swedged teeth of the band saw are adapted to form drip grooves or channels in the confronting face of a board being resawed, Fig. 6 is a perspective view showing a pair of shingles formed by the band saw, Fig. 7 is an enlarged perspective view showing an end of one of the shingles and illustrating the contour of the drip grooves or channels as well as the parallelism thereof.

In the present disclosure, I have shown my improved band saw in conjunction with a machine for sawing shingles and will so describe the invention, but the invention is equally applicable for use in producing siding, panelling or other products.

Referring now more particularly to the drawings, I have, as stated, shown a resaw of the character illustrated in my prior application referred to. The bed of the machine is indicated at 10 and the saw is indicated at 11. Mounted in advance of the saw are pairs of power driven rollers 12 which stand on end at an oblique angle to the vertical plane of the saw. In advance of the rollers is a pair of laterally adjustable guide plates 13 tilted to conform to the inclination of the rollers, and arranged beyond the rollers, at opposite sides of the saw, is a similar pair of laterally adjustable guide plates 14, likewise tilted.

As shown in Fig. 3, the saw is formed of an endless metallic strip. The metal chosen may be the same as conventional band saws so that the saw will possess the desired resiliency and durability and throughout the greater portion of its length the band is formed at one edge with cutting teeth 15 provided, as shown in detail in Fig. 4, with cutting points 16. At points equally spaced from each other, with respect to the length of the saw, the band is provided with groups of combined cutting and channelling teeth 17 and these teeth are formed with cutting points 18. As diagrammatically illustrated in Fig. 3, each group of combined cutting and channelling teeth 17 may occupy a length of the working edge of the saw extending between the transverse lines A and B, these lines being employed on the drawings to bring out the fact that the groups of teeth occupy opposed positions in the total length of the band. The exact number of teeth in each group may, of course, be varied as found most efficient in the practical use of the saw, but, in any event, the portion of the length of the band occupied by the two groups of combined cutting and channelling teeth will, as suggested in the drawings, be relatively small as compared with the total length of the working edge of the saw.

The cutting points 16 of the teeth 15 are substantially triangular shaped, as viewed in plan, and are swedged to project laterally at opposite sides of the plane of the band. The cutting points 18 of the teeth 17 are preferably of the same shape as the points 16, as viewed in plan, but attention is particularly directed to the fact that the cutting points 18 are swedged much wider than the points 16 so that the points 18 project at opposite sides of the plane of the band, beyond the points 16. The width of the cutting points 18 determines the depth of the drip grooves or channels formed in the material being cut.

In practice, boards 19 are used in which the grain runs longitudinally thereof, the boards being previously dressed to provide smooth side faces and being cut to the desired length. These boards are fed between the guide plates 13 with their longitudinal edges abutting so that the boards pass in a continuous stream between the feed rollers 12 and past the saw between the guide plates 14. As will be perceived, each board is thus cut into a pair of shingles 20 of the proper taper, the board being severed longitudinally of its grain substantially parallel thereto.

As each board is thus resawed, each short group of teeth 17 will follow a longer group of teeth 15 through the board and, as brought out in Fig. 5, the wide cutting points 18 of the groups of teeth 17 will cut pairs of confronting channels or grooves 21 in the confronting faces of the severed parts of the board deeper than the saw cut 22 made by the cutting points 16 of the teeth 15. Thus, when the board is completely severed to provide a pair of the shingles 20, each of the shingles is provided at one side face thereof with the drip grooves or channels 21 which conform in contour to the shape of the lateral overhang of any one of the cutting points 18 of the teeth 17. As will be observed, the grooves or channels 21 extend from end to end of the shingle and are straight and parallel to each other as well as substantially parallel to the grain of the wood. Furthermore, as will be observed, the grooves or channels 21 are substantially equally spaced with respect to each other although practice has shown that the spacing of the channels may vary somewhat. Each shingle is, in fact, given, as shown in Fig. 7, a toothed or ribbed effect, the teeth or ribs of each shingle being a counterpart of the overhanging contour of a group of the teeth 17 of the saw at one side of the band. The depth of the grooves or channels 21 is, of course, controlled by the width of the cutting points 18 of the groups of teeth 17 and may accordingly be varied as desired while by accelerating or retarding the feed of the saw, the spacing of the grooves or channels with respect to each other may be varied. In other words, the faster the saw is fed, a correspondingly fewer number of grooves or channels will be cut in any one shingle and vice versa. Experience has shown that a shingle thus provided with pronounced grooves or channels extending longitudinally of the grain of the wood will outlast an ordinary smooth-sawed shingle as moisture may readily drain from the shingle and as the crests of the ribs or teeth of each shingle all touch a common plane, the smooth face of one shingle may be lapped over the grooved face of the shingle therebeneath to provide a tight joint between the shingles.

Having thus described the invention, I claim:

1. A band saw for cutting drip grooves in shingles including an endless band provided at one edge thereof throughout the major portion of the length of the band with kerf-forming chisel-type teeth each having a cutting edge portion extending in a straight line transversely across and beyond the opposite sides of the band and further provided with equi-distantly spaced groups of combined cutting and channeling teeth of the same contour but of greater width than the kerf-forming teeth whereby to form parallel grooves in the walls of a kerf formed in a shingle by said first-mentioned teeth.

2. A band saw for cutting drip grooves in shingles including an endless band provided at one edge thereof with kerf-forming chisel-type teeth having cutting edge portions each extending in a straight line transversely across and beyond the opposite sides of the band, said kerf-forming teeth being interrupted by interposed groups of combined cutting and channeling teeth of the same contour as the kerf-forming teeth but having cutting edges of greater width than the cutting edges of the kerf-forming teeth whereby to form parallel grooves in the walls of a kerf formed in a shingle by the first-mentioned teeth.

3. A band saw for cutting drip grooves in shingles including an endless metallic band provided at one edge thereof with kerf-forming teeth having overhanging cutting edges each extending in a straight line transversely across and beyond the opposite sides of the band and further provided at said edge with a group of combined cutting and channeling teeth interrupting the kerf-forming teeth for a comparatively short distance of the length of said edge of the band, said cutting and channeling teeth being of the same contour as the kerf-forming teeth but having their cutting edges of greater width than the cutting edges of said kerf-forming teeth whereby to form parallel grooves in the walls of a kerf formed in a shingle by said first-mentioned teeth.

4. A band saw for cutting drip grooves in shingles including an endless band provided at one edge thereof with kerf-forming teeth each having a cutting edge and further provided between certain of said kerf-forming teeth with a group of combined cutting and channeling teeth having cutting edges, the cutting edge of each cutting and channeling tooth being extended transversely across and beyond the opposite sides of the band and being wider than the cutting edges of the kerf-forming teeth whereby to form parallel grooves in the walls of a kerf formed in a shingle by the first-mentioned teeth.

EDWARD W. HUTCHINGS. [L. S.]